United States Patent
Kaneko et al.

[11] Patent Number: 5,283,562
[45] Date of Patent: Feb. 1, 1994

[54] MAP DISPLAY APPARATUS

[75] Inventors: Kenji Kaneko; Akira Hayama; Toshiyuki Kimura; Junichi Nishida; Fumio Endo; Hitoshi Sato; Kiyoshi Furukawa, all of Kawagoe, Japan

[73] Assignee: Pioneer Electronic Corporation, Tokyo, Japan

[21] Appl. No.: 51,257

[22] Filed: Apr. 23, 1993

Related U.S. Application Data

[63] Continuation of Ser. No. 645,884, Jan. 25, 1991, abandoned.

[30] Foreign Application Priority Data

Apr. 17, 1990 [JP] Japan ................................ 2-100622

[51] Int. Cl.⁵ .............................................. G09G 1/06
[52] U.S. Cl. ...................................... 345/131; 345/145
[58] Field of Search ............... 340/731, 709, 723, 798, 340/799, 995, 990; 364/443, 449

[56] References Cited

U.S. PATENT DOCUMENTS

| | | | |
|---|---|---|---|
| 4,532,605 | 7/1985 | Waller | 340/731 |
| 4,737,927 | 4/1988 | Hanabusa et al. | 340/995 |
| 4,812,833 | 3/1989 | Shimauchi | 341/23 |
| 4,896,148 | 1/1990 | Kurita | 340/750 |
| 5,032,989 | 7/1991 | Tornetta | 340/731 |

FOREIGN PATENT DOCUMENTS 60-124724  7/1985  Japan .

Primary Examiner—Ulysses Weldon
Assistant Examiner—Doon Yue Chow
Attorney, Agent, or Firm—Keck, Mahin & Cate

[57] ABSTRACT

A map display apparatus for displaying a wide area map and an enlarged map is disclosed. When a display mode is shifted from the mode of displaying the enlarged map to the mode of displaying the wide area map, a cursor frame is displayed on a position on a parent screen corresponding to the divided area which has been displayed in an enlarged manner just before the shift of the display mode, so that the position on the parent screen of the area which has been displayed in the enlarged manner so far can be easily discriminated.

2 Claims, 5 Drawing Sheets

ENLARGE                 WIDE AREA

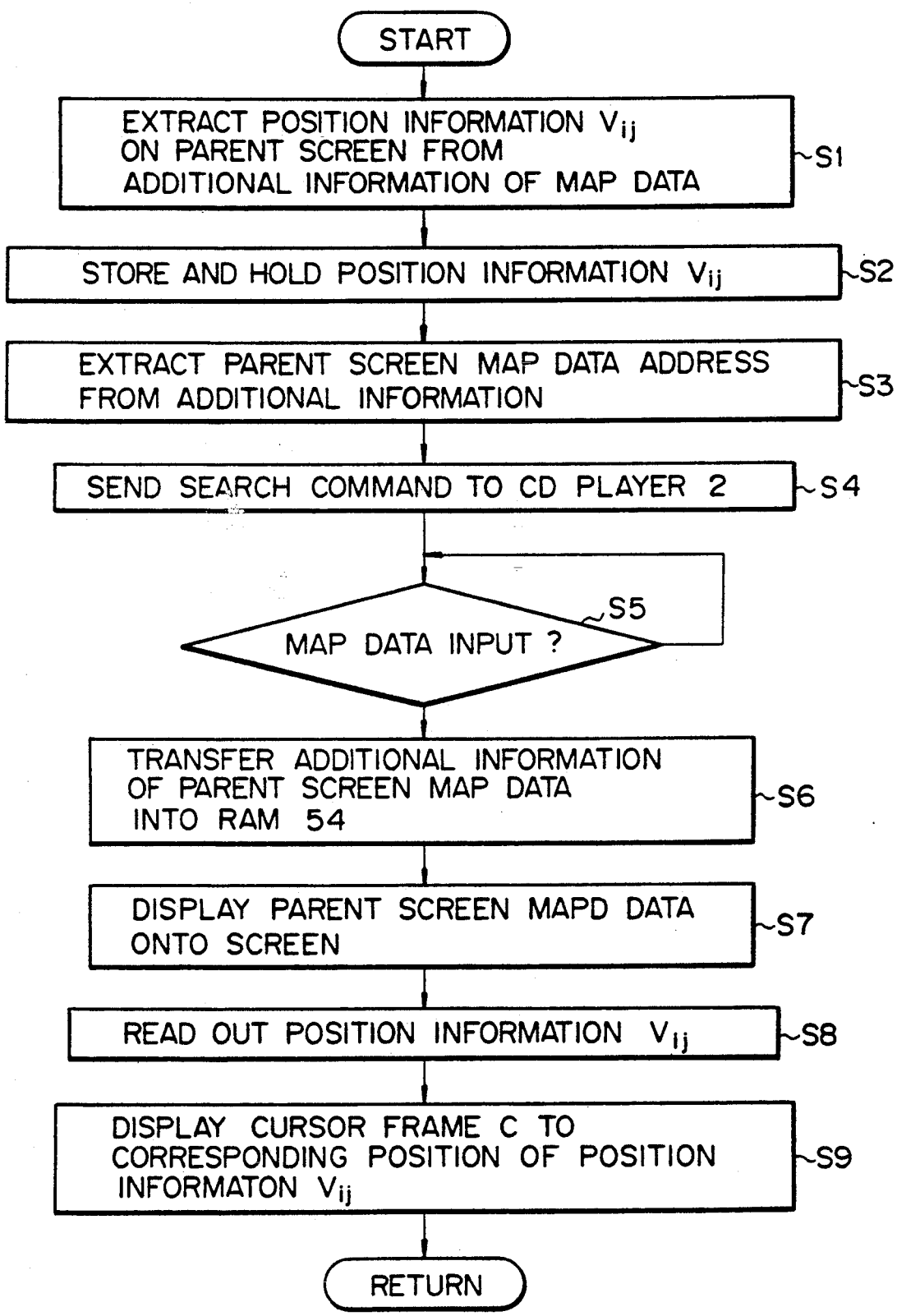

ENLARGE    WIDE AREA

PRIOR ART    PRIOR ART    PRIOR ART

ENLARGE    WIDE AREA

MAP DISPLAY APPARATUS

This is a continuation of application Ser. No. 07/645,884, filed Jan. 25, 1991 is now abandoned.

BACKGROUND OF THE INVENTION

1. Field of the Invention

The present invention relates to a map display apparatus and, more particularly, to a display apparatus which can properly display both of a wide area map and an enlarged map in which a part of the wide area map is displayed in an enlarged state.

2. Description of Background Information

In recent years, there have been developed various systems in which a display unit is mounted in a vehicle as one of equipments used in a vehicle, map data is stored in a storage medium such as a CD-ROM or the like, a group of map data of a desired area is read out from the storage medium by a reading apparatus and is supplied as a display information signal to the display unit, thereby displaying a map onto the display and so that the present location of the vehicle can be confirmed by viewing the displayed map.

Together with the wide area map data group corresponding to a certain wide area, a plurality of divisional map data groups corresponding to a plurality of divided areas which are obtained by dividing the wide area are stored in the storage medium such as a CD-ROM. Therefore, for displaying a map, the wide area can be properly displayed by a wide area map of a small reduction ratio, while one of the plurality of divided areas can be properly displayed by an enlarged map of a large reduction ratio, by reading out necessary map data groups from the CD-ROM and supplying the map data groups as a display information signal to the display.

For instance, a cursor frame C is displayed into a certain area (one of the plurality of divided areas) on the display screen of the wide area map by a key entry of a cursor key as shown in FIG. 7A and a command to display the enlarged map is generated by a key entry. Through these operations the divided area designated by the cursor frame C is displayed as an enlarged map as shown in FIG. 7B. The display state can be brought back from the enlarged map to the original wide area map by generating a command for displaying the wide area map in response to a key entry under the condition of displaying the enlarged map mentioned above.

According to the conventional display method, when what is called a wide area process such as a process for bringing back the display state from the enlarged map to the original wide area map is performed, the cursor frame C is displayed at the center of the wide area map screen as shown in FIG. 7C. Therefore, an inconvenience has been experienced such that the position of the divided area on the wide area map screen corresponding to the enlarged map which has been displayed just before the wide are process is executed cannot be known, so that such a position must be determined relying on the user's memory.

OBJECT AND SUMMARY OF THE INVENTION

It is, therefore, an object of the invention to provide a map display apparatus which can easily discriminate, upon execution of the wide area process, the position on the wide area map screen of a divided area corresponding to an enlarged map which has been displayed just before the wide area process is executed.

A map display apparatus according to the invention comprises: reading means for reading a map data group from a storage medium in which, together with a wide area map data group corresponding to a certain wide area, a plurality of divisional map data groups corresponding to a plurality of divisional areas which are obtained by dividing the wide area are stored so as to include position information indicative of an absolute position on a display area of the wide area; display means for displaying images corresponding to a display information signal being supplied; means for obtaining one of plurality of divisional map data groups which has been read by the reading means and for supplying it as the display information signal, for controlling the display of an enlarged map; holding means for extracting and holding the position information included in the divisional map data group of the displayed enlarged map in response to a wide area display command which is generated during the display of the enlarged map; means for obtaining the wide area map data group which was read by the reading means in response to the wide area display command, for supplying it as the display information signal, for controlling the display of a wide area map; and means for providing a discrimination display signal as the display information signal in order to discriminate and display the absolute position on the display screen which is designated by the position information held in the holding means.

According to the map display apparatus of the invention, a plurality of divisional map data groups corresponding to a plurality of divided areas which are obtained by dividing a certain wide area are stored into the storage medium so as to include the position information indicative of the absolute position of the wide area on the display screen. The position information included in the divisional map data group of the displayed enlarged map is extracted and held in response to the wide area display command which is generated during the display of the enlarged map On the basis of the position information, the absolute position of the divided area which has been displayed so far on the map screen after completion of the wide area process is discriminated and displayed.

BRIEF DESCRIPTION OF THE DRAWINGS

FIG. 5 is a flowchart showing a processing procedure when displaying a wide area map which is executed by a CPU;

DETAILED DESCRIPTION OF THE PREFERRED EMBODIMENT

An embodiment of the present invention will be described in detail hereinafter with reference to the accompanying drawings.

Figure 1:
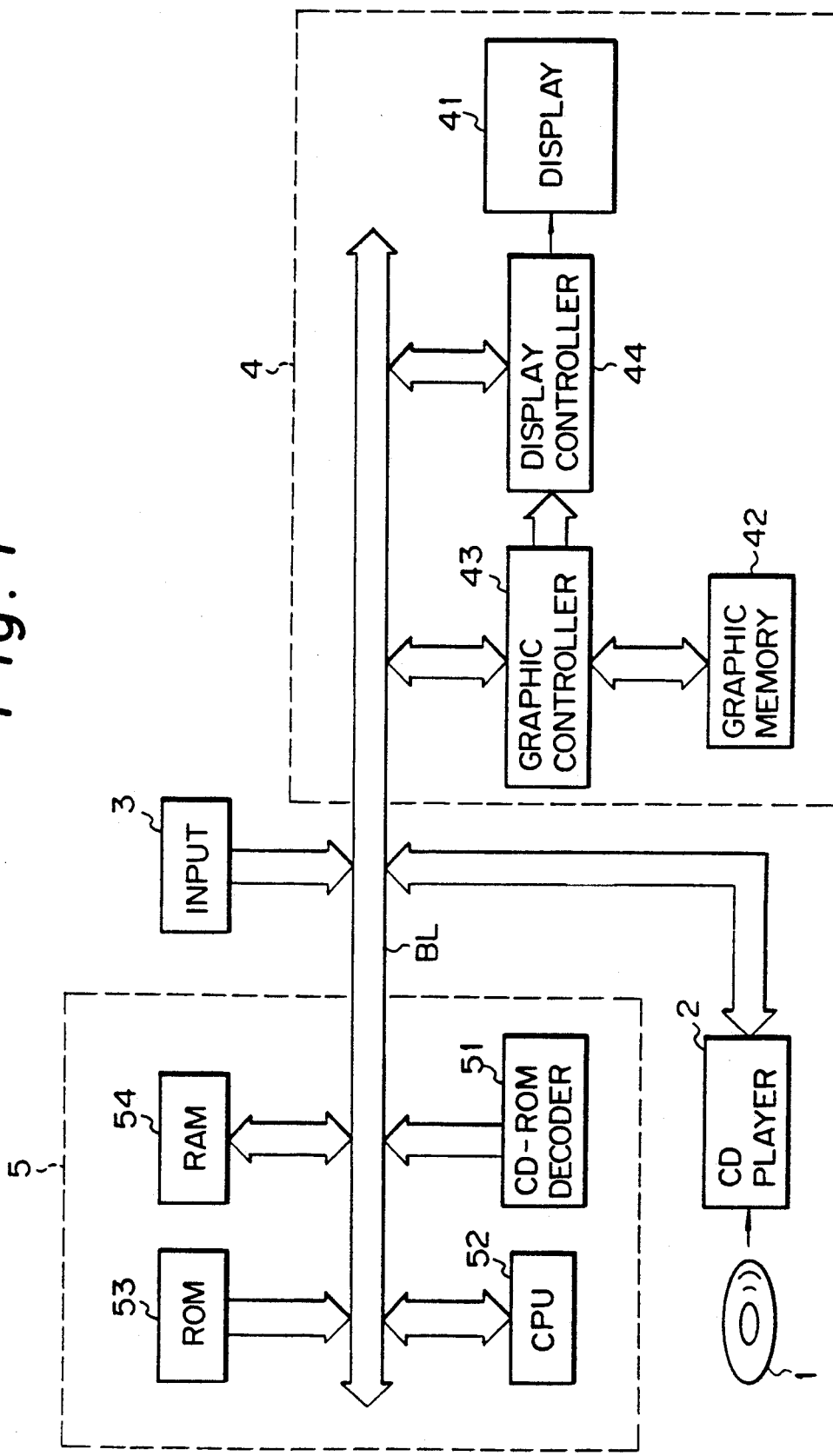
FIG. 1 is a block diagram showing an embodiment of the invention.

FIG. 1 is a block diagram showing an embodiment of the invention. A system of the invention comprises: a CD player 2 for reading map data stored in a storage medium such as a CD-ROM 1; an input section 3 for generating various kinds of commands by the key entry; a display section 4 including a display 41 for displaying a map and a system controller 5 for controlling the whole system. Those components are connected through a bus line BL.

In the case of dividing a whole country of Japan into, for example, four wide areas, together with a wide area map data group corresponding to one wide area, a plurality of divisional map data groups corresponding to a plurality of divided areas which are obtained by dividing the wide area are stored in the single CD-ROM 1. The wide area map or an enlarged map (map of a desired divided area) is displayed on the basis of the map data groups as will be explained later. The display screen of the wide area map by the wide area map data group is hereinafter called a parent screen. The display screen of the enlarged map based on one of the plurality of divisional map data groups is hereinafter called a child screen.

Figure 2:
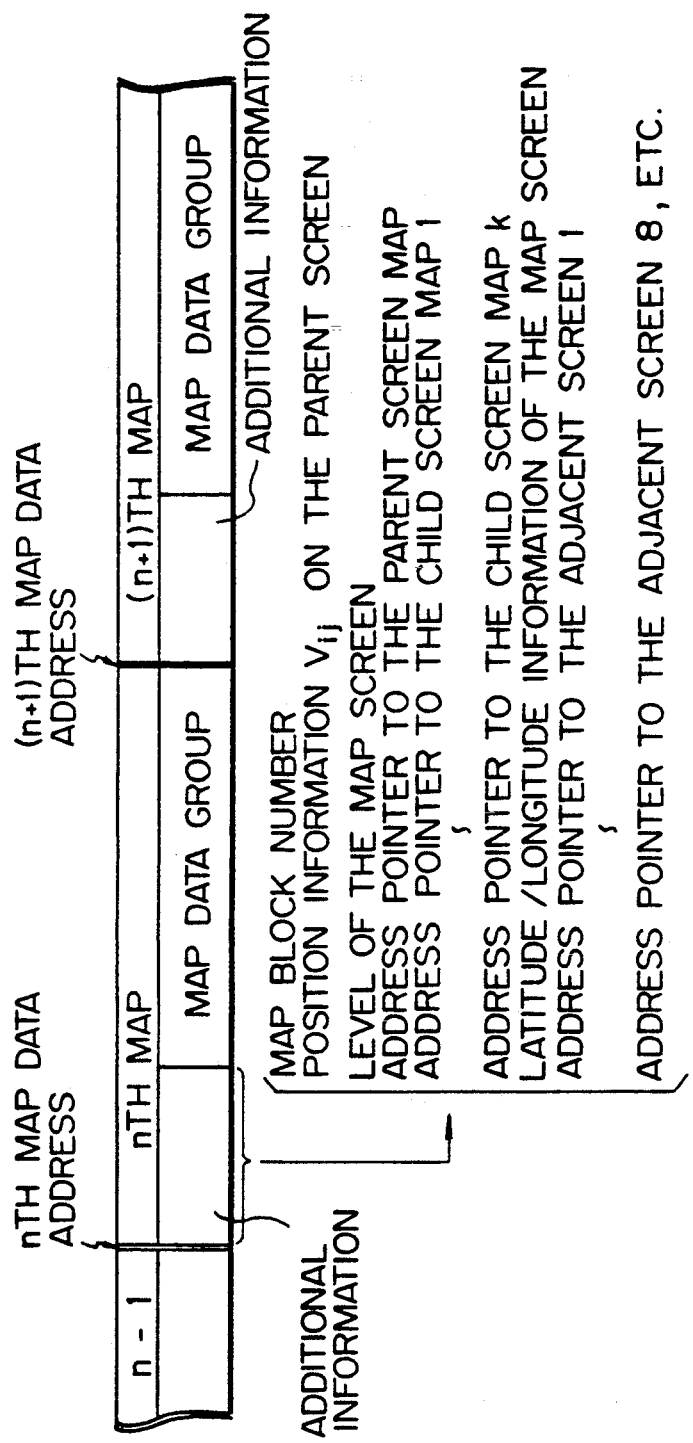
FIG. 2 is a structural diagram of map data of one divided area.
Figure 3:
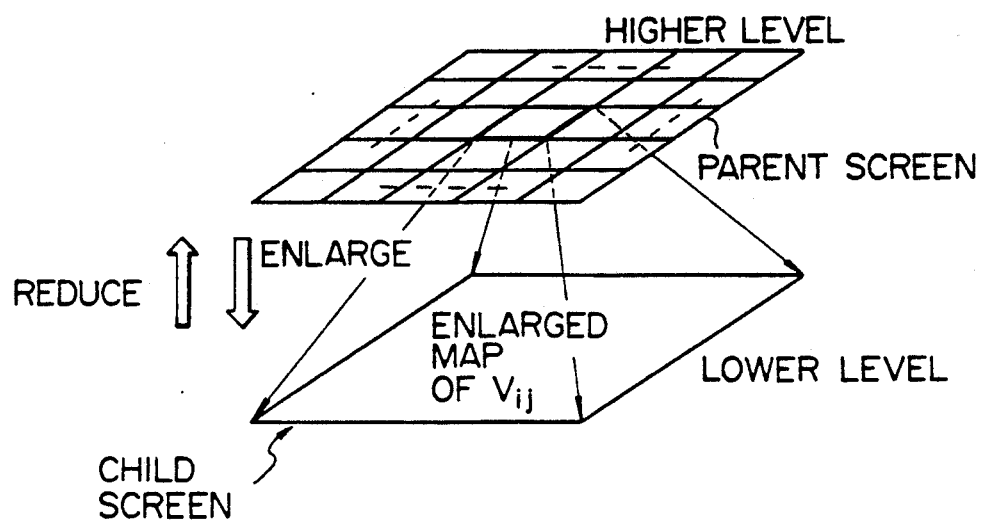
FIG. 3 is a diagram showing the correspondence relation between the parent screen and the child screen.

FIG. 2 shows an example of a map data structure of one enlarged map. With respect to the n-th enlarged map, additional information is first arranged from a data address of the n-th map and the map data group of the n-th enlarged map is then arranged. As the additional information, there are stored the map block number, position information $V_{ij}$ on the parent screen, a level of the map screen, an address pointer to the parent screen map data, address pointers to child screen map data 1 to k, longitude/latitude information of the map screen, address pointers to adjacent screens 1 to 8, coordinate data, address pointer to service list data, an address pointer to a detailed screen, and the like. As shown in FIG. 3, the position information $V_{ij}$ on the parent screen indicates the absolute position of one divided area on the parent screen.

The map data which was read out of the CD-ROM 1 by the CD player 2 is decoded by a CD-ROM decoder 51 in the system controller 5 and is sent to the bus line BL. The system controller 5 comprises: a CD-ROM decoder 51; a CPU (central processing unit) 52 for executing various kinds of operations and controls; an ROM (read only memory) 53 in which various processing programs of the CPU 52 and other necessary information have previously been written; and an RAM (random access memory) 54 into/from which information which is necessary to execute the program, the additional information in the map data which was read out of the CD-ROM decoder 51, and the like are written and read out.

Figure 4:
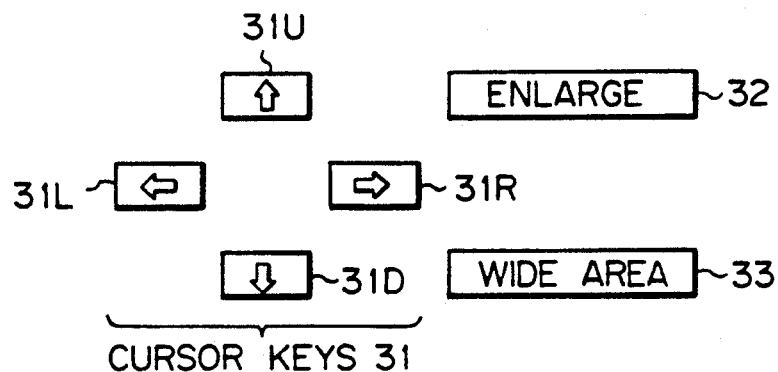
FIG. 4 is a plan view showing a part of a key arrangement in an input section.

As shown in FIG. 4, the input section 3 comprises a keyboard and the like. The keyboard includes: for instance, four cursor keys 31 which are used for movement or the like of the display position of the cursor frame C which is displayed on the screen together with the map; an enlarged display command key 32 to instruct an enlarged display of one divided area; and a wide area display command key 33 to instruct a display of the wide area including the enlarged divided area. The input section 3 generates various commands to the system controller 5 by a key input of the user.

The display section 4 comprises: a display 41 such as a liquid crystal display or the like; a graphic memory 42 which is constructed by a V(Video)-RAM and the like; a graphic controller 43 for drawing the map data which is sent from the system controller 5 into the graphic memory 42 as the image data and for outputting the image data; and a display controller 44 for allowing the map to be displayed onto the display 41 on the basis of the image data which is output from the graphic controller 43.

A processing procedure to display a wide area map which is executed by the CPU 52 in the system controller 5 will now be described with reference to a flowchart of FIG. 5. It is assumed that this processing routine is called and executed when the wide area display command is generated by the key input of the wide area display command key 33 which is performed by the user during the display of the enlarged map.

When the wide area display command is generated, the CPU 52 first extracts the position information $V_{ij}$ on the parent screen from the additional information in the map data of the enlarged map which is being displayed at present (step S1). The position information $V_{ij}$ is stored and held into a determined address (buffer memory) in the RAM 54 (step S2). Further, the parent screen map data address is extracted from the additional information (step S3). A search command is sent to the CD player 2 to search the parent screen map data address (step S4). In response to the search command, the CD player 2 searches the parent screen map data address for the CD-ROM 1 and reads out the map data of the wide area map stored in the searched address under the control of an internal controller. The read map data is supplied to the system controller 5 and is decoded by the CD-ROM decoder 51 and is sent to the bus line BL.

When the map data has been sent to the bus line BL, the CPU 52 determines that the map data has been read out (step S5). The additional information in the map data of the wide area map is transferred to a predetermined memory area in the RAM 54 (step S6). The map data is supplied as ma display information to the display section 4. The CPU 52 controls the graphic controller 43 and the display controller 44, thereby allowing the wide area map to be displayed on the display 41 (step S7). Subsequently, the CPU 52 reads out the position information $V_{ij}$ which was stored and held in step S2 from the predetermined address (buffer memory) in the RAM 54 (step S8). The position information $V_{ij}$ is supplied as the cursor frame display information to the display section 4. The CPU 52 controls the graphic controller 43 and the display controller 44, thereby allowing the cursor frame C to be displayed at the position corresponding to the parent screen displayed by the display 41 (step S9).

Figures 6A, 6B, 6C:
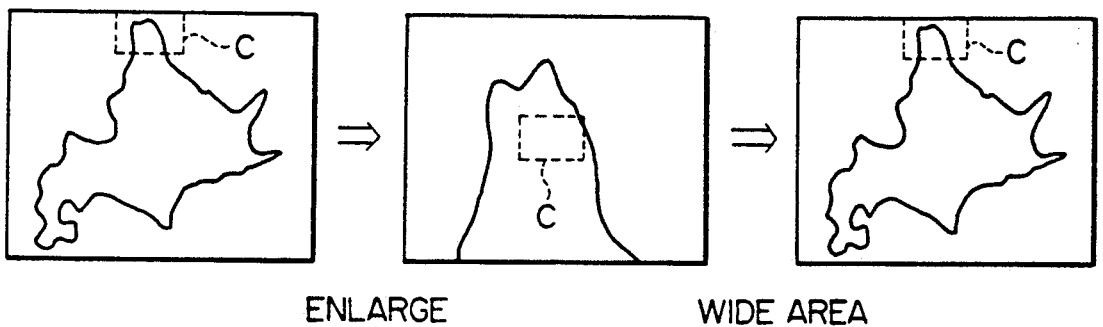
FIGS. 6A to 6C are diagrams showing display positions of a cursor frame C when a wide area process is performed by the processing procedure of FIG. 5.
Figures 7A, 7B, 7C:
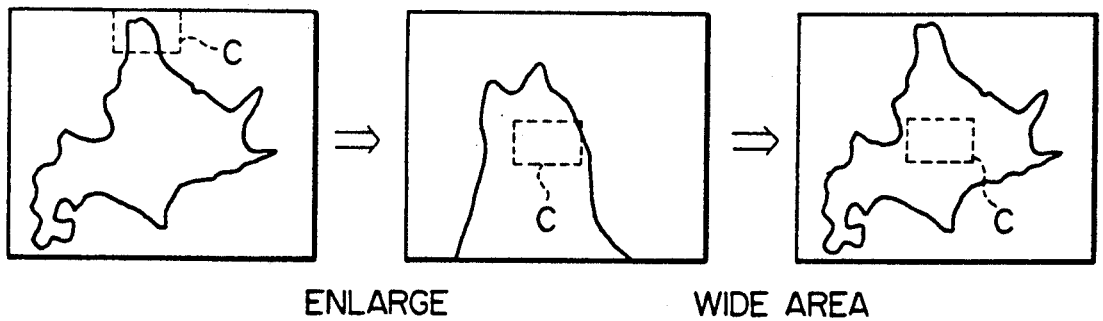
FIGS. 7A to 7C are diagrams showing display positions of the cursor frame C when the wide area process is executed in a conventional apparatus.

According to the processing procedure described above, for instance, in the case where the cursor frame C is displayed in a specific area (one of a plurality of divided areas) on the parent screen as shown in FIG. 6A by a key entry through the cursor key 31 and the special area designated by the cursor frame C was displayed in an enlarged manner as shown in FIG. 6B by the enlarged display command by the enlarged display command key 32, when the original wide area map is again displayed by the wide area display command by the wide area display command key 33, the cursor frame C is displayed at the position on the parent screen corresponding to the divided area which has been displayed in the enlarged manner just before the display of the original wide area map as shown in FIG. 6C. Thus, the position on the parent screen of the divided area which has been displayed in the enlarged manner so far can be easily discriminated. Moreover, in the case of again displaying in the enlarged manner the same divided area, such a display can be easily realized by a simple operation of only a key input of the enlarged display command key 32.

In the embodiment, the position on the parent screen of the divided area which has been displayed in the enlarged manner is discriminated and displayed by the cursor frame C. However, the invention is not limited to the cursor frame C. In brief, it is sufficient that the position on the parent screen can be discriminated and displayed. For instance, the relevant divisional area on the parent screen can be also discriminated and displayed by using a predetermined color or a blinking of the display area.

As described above, in the map display apparatus according to the invention, a plurality of divisional map data groups corresponding to a plurality of divisional areas which are obtained by dividing a predetermined wide area are stored into a storage medium so as to also include position information indicative of the absolute position of the wide area on the display screen. The position information included in the divisional map data group of the enlarged map which is being displayed is extracted and held in response to a wide area display command which is generated during the display of the enlarged map. On the basis of the position information, the absolute position of the divided area which has been displayed so far is discriminated and displayed on the map screen after completion of the wide area process. Therefore, when the wide area process is executed, the position on the parent screen of the divided area corresponding to the enlarged map which has been displayed just before the execution of the wide area process can be easily discriminated.

What is claimed is:

1. A map display apparatus comprising:
    reading means for reading a map data group corresponding to a predetermined wide are, said wide area map data group including in addition to data for generating a wide area map, position information indicative of the absolute position of each one of a plurality of divisional maps on said wide area map, and a plurality of divisional map data groups corresponding to a plurality of divisional areas which are obtained by dividing the wide area map into divisional areas, each of said plurality of divisional data groups including in addition to data for generating an enlarged map, position information corresponding to that stored in said wide area map data group indicative of an absolute position of the divisional area on said wide area map;
    display means for displaying an image according to a display information signal;
    means for obtaining one of said plurality of divisional map data groups from said reading means for providing said one divisional map data group as the display information signal, thereby allowing display of an enlarged map corresponding to the divisional area represented by said one division map data group;
    holding means for extracting and holding said position information included in the divisional map data group indicative of the absolute position of the enlarged map which is being displayed on said wide area map in response to a wide area display command which is generated during the display of the enlarged map;
    means for obtaining the wide area map data group from the reading means in response to the wide area display command, for supply as the display information signal to the display means, thereby allowing display of said wide area map; and
    means for supplying from said holding means, as a further display information signal, a position display signal to display the absolute position of the enlarged map which was being displayed when said wide area display command was given on the display of the wide area map, based upon the position information held in the holding means.

2. An apparatus according to claim 1, wherein said means for supplying is operative to supply said position display signal to said display means as a signal for displaying the absolute position on the display means corresponding to the position information as a cursor frame, using a predetermined color, or a blinking of a display area.

* * * * *